Sept. 27, 1966  R. E. BEVERLY, JR  3,274,690
DEVICE FOR MEASURING LIQUID IN CONTAINERS
Filed July 24, 1963  2 Sheets-Sheet 1

INVENTOR.
Robert E. Beverly, Jr.
BY
Newton, Hopkins & Jones
ATTORNEYS

Sept. 27, 1966 R. E. BEVERLY, JR 3,274,690
DEVICE FOR MEASURING LIQUID IN CONTAINERS
Filed July 24, 1963 2 Sheets-Sheet 2

INVENTOR.
Robert E. Beverly, Jr.
BY
Newton, Hopkins & Jones
ATTORNEYS

United States Patent Office 3,274,690
Patented Sept. 27, 1966

3,274,690
DEVICE FOR MEASURING LIQUID IN CONTAINERS
Robert E. Beverly, Jr., Atlanta, Ga., assignor to Zac-Lac Paint & Lacquer Corp., Atlanta, Ga., a corporation of Georgia
Filed July 24, 1963, Ser. No. 297,441
3 Claims. (Cl. 33—126.7)

This invention relates to measuring devices and more particularly to a measuring device for measuring the volume of a liquid in any one of a plurality of containers of various fixed sizes.

It is frequently necessary to mix or combine various liquids by volume. When this mixing of liquids must be accomplished frequently and quickly and when the number of liquids to be mixed and the volume of each varies with each mixing, the mixing of liquids is a burdensome task even when using some standard relating the dimensions of the filled portion of the container to liquid volume. The task becomes particularly burdensome when the size of the container in which the liquids are mixed frequently changes since a new standard is necessary for each different-sized container. Such a particularly burdensome task is common in retail paint stores selling paint in various quantities and mixed to meet specific customer requirements.

The invention described herein is a measuring device which permits various liquids to be accurately, conveniently and quickly measured and mixed in containers of various sizes and with the volumes of the various liquids in the mixture freely variable. This is accomplished by a measuring device which visually indicates the total volume of the liquid or liquids in a container at any particular step in the mixing process. The volume of the liquid is indicated by using a rod whose vertical position is responsive to the volume of the liquid in a particular container and a counter whose visual indication is responsive to the vertical position of the rod and is in terms of the same units of liquid volume regardless of the dimensions of the particular container.

As the various liquids comprising a mixture are placed in a container, the visual indication of the counter permits the exact volume of each liquid to be measured and placed in the container without difficulty and time consuming calculations. After a liquid mixture has been prepared in a container with certain dimensions, the invention is quickly and easily adjustable to measuring in the same units of liquid volume the liquid in a container with entirely different dimensions. Thus, the measuring device described herein is ideally suited to the large volume measuring and mixing of liquids in various proportions and in containers of various sizes.

These and other features and advantages of the invention will be more clearly understood from the following detailed description and the accompanying drawings, in which like characters of reference designate corresponding parts in all figures, and in which.

Figure 4:
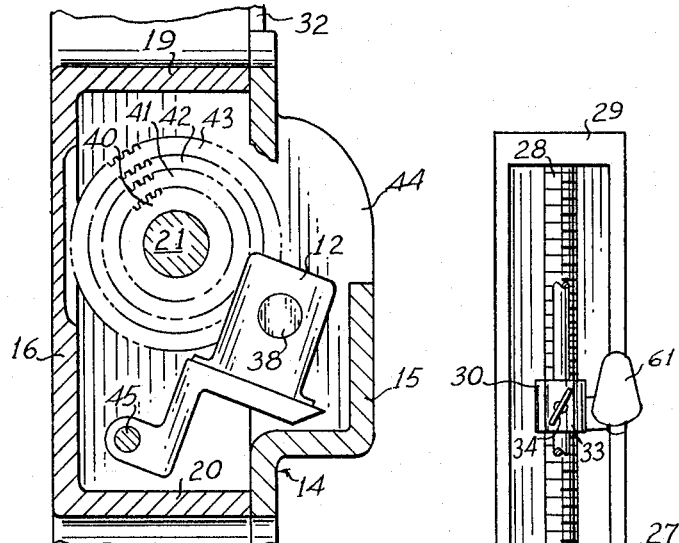
FIG. 4 is a section view of the gear housing of the measuring device taken in line 4—4 of FIG. 1 and showing the interior of the gear housing with background details omitted.
Figure 1:
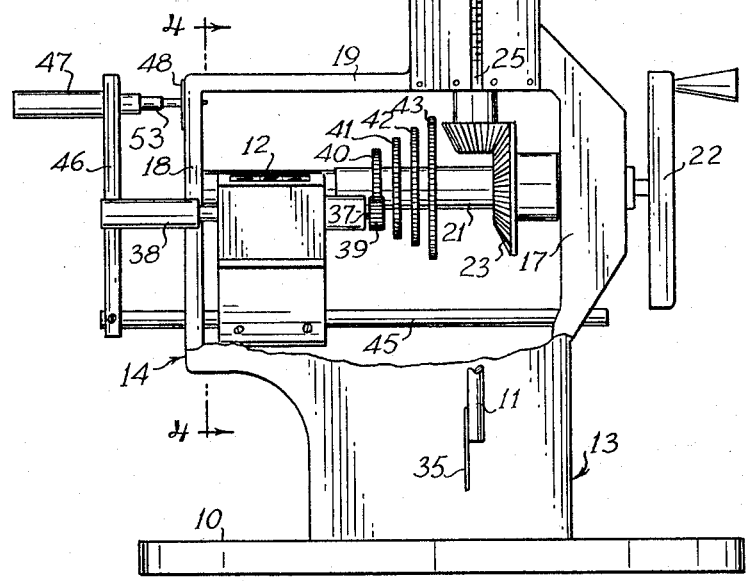
FIG. 1 is a front elevation view of the measuring device with a portion of the gear housing and of the vertical casing removed to reveal the gear and screw arrangement.

These figures and the following detailed description disclose a preferred specific embodiment of the invention, but the invention is not limited to the details disclosed since it may be embodied in other equivalent forms.

This invention is best understood as a measuring device comprised of a platform 10, a rod 11 vertically movable with respect to the platform 10, and a counter 12 selectively responsive to the vertical position of the rod 11. The platform 10 is flat and of sufficient area for the largest container with which it is desired to use the measuring device to be placed upright upon it. Integrally associated with and near the side of the platform 10 is the base 13 of the gear housing 14. The gear housing 14 is essentially box-shaped with a front panel 15, a back panel 16, a right end panel 17, a left end panel 18, a top panel 19 and a bottom panel 20. The base 13 is integral with the bottom panel 20 and serves to fixedly position the gear housing 14 with respect to the platform 10.

Within the gear housing 14 and extending between its right end panel 17 and left end panel 18 is a gear axle 21. The gear axle 21 is rotatably inserted into a hole in the left end panel 18 and extends through the right end panel 17 to provide an extending end to which a crank 22 is attached. Mounted on the gear axle 21 adjacent to the right end panel 17 is the pinion 23 of a bevel gear. Rotation of the gear axle 21 by the crank 22 rotates the pinion 23.

The ring 24 of the bevel gear is at the lower end 25 of a screw 26. The screw 26 extends from its lower end 25 upward through the top panel 19 of the gear housing 14 where it is enclosed in a vertical casing 27. The screw 26 is positioned within the vertical casing 27 with its centerline perpendicular to the plane of the platform 10 by inserting its upper end 28 into a hole in the top 29 of the vertical casing 27 and by providing a sleeve of known type where the screw 26 passes through the top panel 19 of the gear housing 14. The bevel gear arrangement results in rotation of the gear axle 21 by the crank 22 causing rotation of the screw 26.

Positioned on the screw 26 is a sleeve 30. The sleeve 30 is of known type and travels up the screw 26 with rotation of the screw 26 in one direction and down the screw 26 with rotation of the screw 26 in the opposite direction. Extending from the sleeve 30 is an arm 31. The arm 31 extends through a slit 32 in the vertical casing 27 and the length of the slit 32 permits the arm 31 to travel with the sleeve 30 as the sleeve 30 moves up and down the screw 26. At the extending end of the arm 31 is a collar 33 having a hole whose centerline is perpendicular to the plane of the platform 10.

The rod 11 is slidably inserted in the collar 33 where it is fixedly, but movably, positioned by a set screw 34 which extends through the collar 33 and engages the side of the rod 11. The centerline of rod 11 coincides with the centerline of the hole in the collar 33 and is perpendicular to the plane of the platform 10. At the lower end of the rod 11 is a triangularly shaped plate 35 having a side 36 substantially parallel to the plane of the platform. When the crank is rotated, the side 36 of the plate 35 moves toward or away from the platform 10 depending upon the direction in which the crank 22 is rotated.

The position of the side 36 of the plate 35 relative to the platform 10 is used to detect the quantity of liquid in a container. When the side 36 is positioned by rotation of the crank 22 so that the side 36 just touches the surface of the liquid in a container so as to form a meniscus, the vertical position of the side 36 relative to its position when it is just touching the bottom of the container and relative to its position when it is forming a meniscus with the container full of liquid is indicative of the volume of liquid in the container at the particular moment.

In terms of the total volume of liquid the container will hold, the vertical position of the side 36 is indicative of what portion of this total volume is in the container. This is because each unit of vertical motion of the edge 36 represents a certain fixed portion of the total volume of liquid which the container will hold. However, each unit also represents a specific volume of liquid and the position of the edge 36 is preferably used to measure the quantity of liquid in the container directly as a specific volume of liquid rather than as a certain portion of the total volume of liquid which the container will hold. What is detected or measured and visually indicated by rod 11 position is dependent upon the relationship between rod 11 movement and the indication of counter 12 as described below.

The counter 12 is used to visually indicate the volume of liquid in a container. The counter 12 is of known type having indicia which change with rotation of a counter shaft 37 and which may be manually zeroed by a clearing pin 38. The counter shaft 37 has a gear wheel 39 at its end which will selectively engage one of four drive gears 40, 41, 42, and 43. The drive gears 40, 41, 42 and 43 are positioned along the length of the gear axle 21 between the pinion 23 and the left end panel 18 of the gear housing 14 and they rotate with the gear axle 21 as its rotation raises and lowers the edge 36 of the plate 35.

The drive gears 40, 41, 42 and 43 have different diameters and the change in the indicia of the counter 12 with each turn of the gear axle 21 and for the same change in the vertical position of the edge 36 will depend upon which drive gear 40, 41, 42, or 43 the gear wheel 39 is engaging at the moment. The indicia of the counter 12 are visible through a window 44 in the front panel 15 of the gear housing 14 and the counter 12 is positioned so that the gear wheel 39 will selectively engage one of the drive wheels 40, 41, 42 and 43 by mounting the counter 12 within the gear hosuing 14 on a pin 45 extending through a hole in the right end panel 17 and a hole in the left end panel 18.

The centerline of the pin 45 is parallel to the gear axle 21 and the pin 45 is slidably movable along its centerline. Slidable motion of the pin 45 moves the counter 12 and gear wheel 39 along the length of the gear axle 21 so that the gear wheel 39 is easily placed in the same vertical plane as one of the drive gears 40, 41, 42, or 43. The pin 45 is also rotatable and the gear wheel 39 is rotated away from the gear axle 21 to obtain freedom for slidable motion and is rotated toward the gear axle 21 so that the gear wheel 39 will engage a drive gear 40, 41, 42, or 43. The clearing pin 38 extends through a slot 62 in the left end panel 18 which is shaped to permit the extending clearing pin 32 to freely move as the counter 12 is rotated about the pin 45.

Rotational and slidable motion of the pin 45 is controlled by a lever 46 fixedly attached to the end of the pin 45 extending beyond the left end panel 18 of the gear housing 14. Pivoting of the lever 46 about the centerline of the pin 45 determines the rotational position of the pin 45 and counter 12 and motion of the lever 46 toward and away from the left end panel 18 determines the slidable position along the gear axle 21 of the pin 45 and counter 12.

Figures 2, 3:
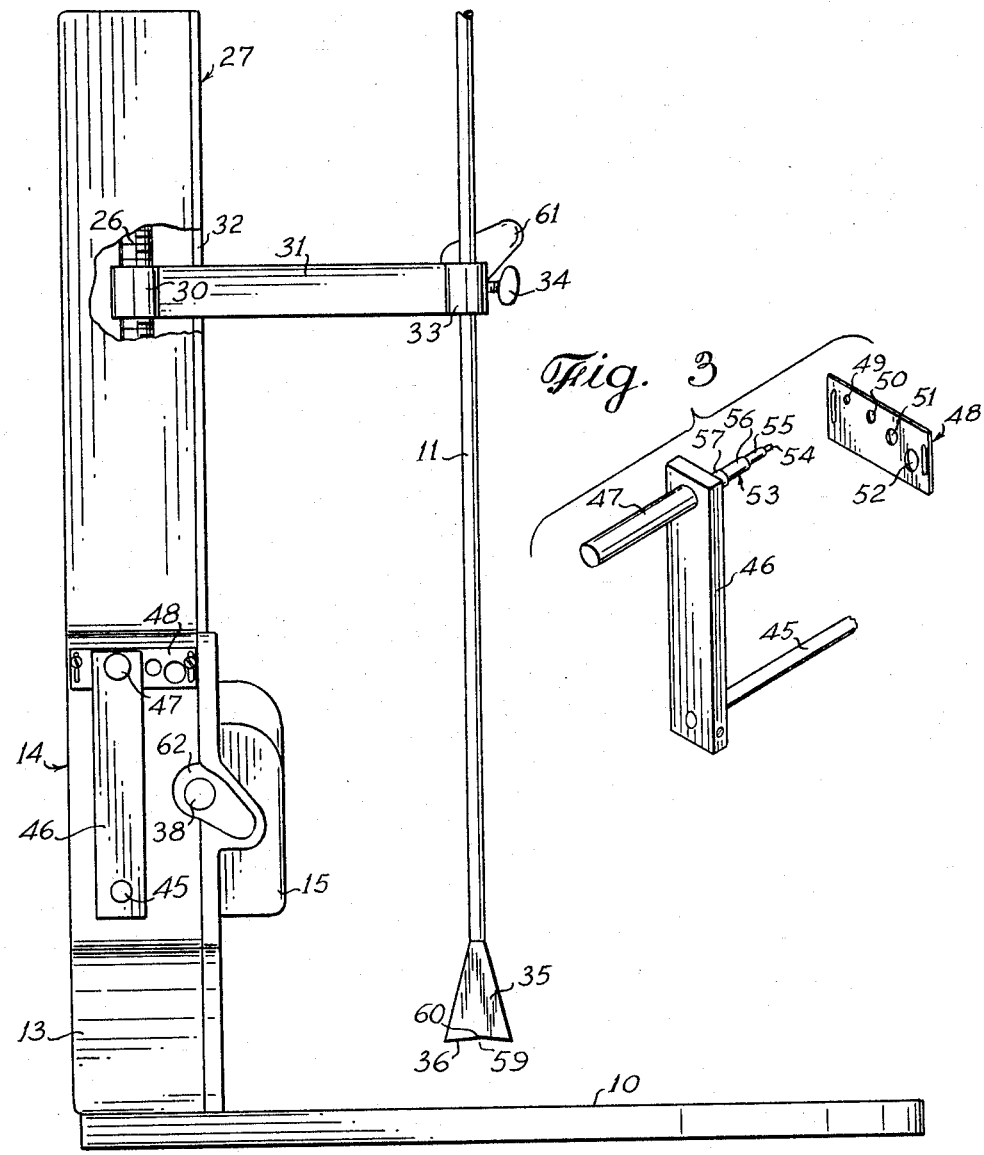
FIG. 2 is a side elevation view of the measuring device with a portion of the vertical casing removed to reveal the mounting of the sleeve and arm on the screw.
FIG. 3 is an exploded perspective view of the gear selecting portion of the measuring device.

The proper pivotal position of the lever 46 and the proper positon of the lever 46 relative to the left end panel 18 of the gear housing 14 for the gear wheel 39 to engage each of the drive gears 40, 41, 42 and 43 is controlled by the gear selecting portion of the measuring device shown in detail in FIG. 3. The gear selecting portion is comprised of the lever 46, a peg 47 fixedly inserted through that end of the lever 46 most remote from the pin 45, and a positioning scale 48 fixedly mounted on the left end panel 18 of the gear housing 14. The peg 47 extends toward the scale 48 with the centerline of the peg 47 perpendicular to the plane of the scale 48 and the scale 48 has four holes 49, 50, 51, and 52 through it and the gear housing 14 behind it. The holes 49, 50, 51 and 52 are of different diameters and are arranged along an arc corresponding to the arc described by the extending portion 53 of the peg 47 as the lever 46 pivots about the pin 45. As the lever 46 pivots, the centerline of the extending portion 53 of the peg 47 will coincide in succession with the centerline of each of the holes 49, 50, 51, and 52.

The extending portions 53 of the peg 47 is formed of four segments, 54, 55, 56, and 57, each having a diameter greater than that of any segment 54, 55, or 56 more remote from the lever 46 than it. The first segment 54 is at the end of the extending portion 53 of the peg 47 and its diameter is substantially the same as the diameter of the first hole 49 in the scale 48. The second segment 55 is next to the first segment 54 and its diameter is greater than that of the first hole 49, but substantially the same as that of the second hole 50 in the scale 48. This selection of the segment 54, segment 55, hole 49 and hole 50 diameters permits the first segment 54 of the peg 47 to be inserted in hole 49 and the first segment 54 and second segment 55 to be inserted in hole 50. Similarly, the diameters of third segment 56, the fourth segment 57, the hole 51 and the hole 52 permit the first segment 54, the second segment 55 and third segment 56 to be inserted in the hole 51 and the first segment 54, the second segment 55, the third segment 56 and fourth segment 57 to be inserted in hole 52.

The position of the holes 49, 50, 51, and 52 along the arc described by the extending portion 53 of the peg 47 and total length of the segments 54, 55, 56, and 57 insertable into a hole 49, 50, 51, or 52 determines the position of the lever 46, the pin 45, and the gear wheel 39 of the counter 12. The lengths of the segments 54, 55, 56, and 57 and the positions of the holes 49, 50, 51 and 52 are selected so that when the first segment 54 is inserted into the hole 49, the gear wheel 39 is engaging the first drive gear 40 and when the first segment 54 and second segment 55 are inserted in the hole 50, the gear wheel 39 is engaging the second drive gear 41. Similarly, when the first segment 54, the second segment 55, and the third segment 56 are inserted in hole 51, the gear wheel 39 is engaging the third drive gear 42 and when the first segment 54, the second segment 55, the third segment 56 and the fourth segment 57 are inserted in hole 52, the gear wheel 39 is engaging the fourth drive gear 43.

The diameter of the first drive gear 40 is selected so that when the gear wheel 39 is engaging it, rotation of the gear axle 21 and vertical motion of the edge 36 of the plate 35 will change the indicia of the counter 12 a specific number of units as the edge 36 moves a vertical distance equal to the total change in of the second drive gear 41 is selected so that when the gear wheel 39 is engaging it, rotation of the gear axle 21 and vertical motion of the edge 36 will change the indicia of the counter 12 a specific number of units as the edge 36 moves a vertical distance equal to the total change in liquid level in a standard half gallon container when the container is filled with liquid. The diameter of the third drive gear 42 will produce a similar result with respect to a standard quart container and the diameter of the fourth drive gear 43 will produce a similar result with respect to a standard pint container.

The specific number of units the indicia of the counter 12 will change as a container is filled may be the same for the various sized containers. This results in the same indicia change for the same proportional change in volume of liquid regardless of whether a gallon, half gallon, quart or pint container is being used. Where mixing of liquids is to be accomplished in terms of parts of the whole container volume, this arrangement permits the same indicia readings to be used in measuring regardless of the size of the container.

However, where formulation of the liquid mixture is to be in terms of specific units of volume, such as half pints or pints, the proper selection of diameters for drive gears 40, 41, 42, and 43 and of indicia for the counter 12 will permit the quantity of liquid in a container to be measured and indicated by the counter 12 in terms of this specific unit of volume regardless of whether the container is a pint, quart, half gallon, gallon or other standard container. It is simply necessary that the drive gears 40, 41, 42 and 43 be selected so that the vertical motion of the rod 11 corresponding to the height of the specific unit of volume in each of the standard containers changes the indicia of the counter 12 by the same amount. Once this is accomplished, mixing in various sizes of containers becomes simply a matter of selecting the appropriate drive gear 40, 41, 42, and 43 with the gear selecting portion of the measuring device.

Proper positioning of the rod 11 so that its vertical position will detect the volume of liquid in a container is facilitated by a notch 59 in the side 36 of the plate 35. This notch 59 is shallow and permits the operator of the measuring device to use the gap between the surface of the liquid and the apex 60 of the notch 59 as a standard of reference in addition of the meniscus. For accurate measuring of liquids it is simply necessary that the proper driving gear 40, 41, 42, or 43 be selected and that the operator consistently use the same standard of contact between the side 36 of the plate 35 and the liquid each time a measurement is made.

It has been found that when mixing liquids in a container it is usually most convenient to adjust the vertical position of the rod 11 until the counter 12 indicates that volume of liquid to be added and then add the liquid until contact between the plate 35 and the liquid indicates that the desired amount of liquid has been added. The initial adjustment of the rod 11 premeasures the amount of liquid to be added and the counter 12 reading after the initial adjustment, after the liquid has been added and before the next adjustment directly indicates the total volume of liquid in the container. Where it is desired that the counter 12 indicate only the volume of liquid added at each step, it is simply necessary to zero the counter 12 with the clearing pin 38 after the addition of each liquid in the mixture.

A light fixture 61 is positioned on the arm 31 adjacent to the collar 33. The light cast by this light fixture 61 will shine on the surface of the liquid in a container positioned on the platform 10 beneath the rod 11. The light fixture 61 is to one side of the collar 33 and casts more light on surface of the liquid on one side of the plate 35 than on the other. As a result, the light fixture 61 not only permits the meniscus to be easily used as the standard, but it tends to outline the notch 59 when the notch is viewed by the operator from the relatively dark side of the plate 35.

It will be obvious to those skilled in the art that many variations may be made in the embodiments chosen for the purpose of illustrating the present invention without departing from the scope thereof as defined by the appended claims.

What is claimed as this invention is:

1. A device for measuring the volume of liquid in pint, quart, half gallon, or gallon containers in terms of the same particular volume of liquid measurement, said device comprising, in combination, a horizontal platform; a gear housing fixedly positioned adjacent to the platform having a left end panel with a slot, a right end panel, a front panel with a window, and a top panel; a vertical casing extending from the top panel of the gear housing perpendicular to the horizontal platform and having a vertical slit in its side; a gear axle extending within the gear housing between the left end panel and the right end panel of the gear housing; a screw within the vertical casing perpendicular to the gear axle and having a lower end which extends into the gear housing; a bevel gear having its pinion on and rotatable with the gear axle and its ring on and rotatable with the lower end of the screw; a sleeve positioned on the screw and vertically movable in response to the rotation of the screw; an arm fixedly attached at one end to the sleeve, extending horizontally through the slit, and having its extending end over the platform; a collar fixedly attached to the extending end of the arm; a rod fixedly, but movably inserted through the collar, said rod extending perpendicular to and toward the platform and having a lower end; a plate fixedly attached to the lower end of the rod and having an edge substantially parallel to the platform with a notch in it; a counter pin extending between the left end panel and the right end panel parallel to the gear axle, said counter pin being rotatable and slidably movable along its length; a counter having a counter shaft, indicia which change with revolutions of the counter shaft, and a clearing pin which changes the indicia to zero when rotated, said counter being fixedly positioned on and movable with the counter pin and having its counter shaft extending parallel to the gear axle toward the right end panel, its clearing pin extending through the slot in the left end panel, and its indicia visible through the window of the front panel; a gear wheel on and rotatable with the extending end of the counter shaft; a lever extending perpendicular to the counter pin and having a first end and a second end fixedly attached to that end of the counter pin extending through the left end panel; a peg fixedly positioned in the first end of the lever and having an end extending toward the left end panel of the gear housing, said peg having a first segment with a diameter and a length, a second segment between the first segment and the lever and with a diameter greater than the diameter of the first segment and a length, a third segment between the second segment and the lever and with a diameter greater than the diameter of the second segment and a length, and a fourth segment between the third segment and the lever and with a diameter greater than the diameter of the third segment and a length; a scale fixedly mounted on the left end panel of the gear housing and having four recesses located along the arc described by the first segment of the peg when the lever pivots with rotation of the counter pin, the first recess having a diameter substantially equal to that of the first segment of the peg, the second recess having a diameter substantially equal to that of the second segment of the peg and being a first straight line distance from the first recess, the third recess having a diameter substantially equal to that of the third segment of the peg and being a second straight line distance from the second recess, and the fourth recess having a diameter substantially equal to that of the fourth segment of the peg and being a third straight line distance from the third recess; four drive wheels on and rotatable with the gear axle, the first drive wheel having a position along the length of the gear axle which places it in engagement with the gear wheel when the first segment of the peg is in the first recess in the scale, the second drive wheel being positioned on the gear axle between the first drive wheel and right side panel of the gear housing a distance from the first drive wheel equal to the length of the second segment of the peg and having a diameter larger than the diameter of the first drive wheel by an amount equal to the straight line distance between the first recess and the second recess, the third drive wheel being positioned between the second drive wheel and the right side panel a distance from the second drive wheel equal to the length of the third segment of the peg and having a diameter greater than the diameter of the second drive wheel by an amount equal to the straight-line distance between the second recess and third recess, the fourth drive wheel being positioned between the third drive wheel and the right side panel of the gear housing a distance from the third drive wheel equal to the length of the fourth segment of the peg and having a diameter greater than the diameter of the third drive wheel by an amount equal to the straight-line distance between the third recess and the fourth recess, and the diameters of the four drive wheels being such that a point on the first drive wheel travels a specific distance as the rod moves a vertical distance equal to the change in the surface level of a liquid in a pint container when the particular volume of liquid is added, a point on the second drive wheel travels the same specific distance as the rod moves a vertical distance equal to the change in the surface level of a liquid in a quart container when the particular volume of liquid is added, a point on the third drive wheel travels the same specific distance as the rod moves a vertical distance equal to the change in the surface level of a liquid in a half gallon container when the particular volume of liquid is added, and a point on the fourth drive wheel travels the same specific distance as the rod moves a vertical distance equal to the change in surface level of a liquid in a gallon container when the particular volume of liquid is added; and means for rotating the gear axle.

2. A device for measuring the volume of liquid in pint, quart, half gallon or gallon containers in terms of portions of total container volume, said device comprising, in combination, a horizontal platform; a gear housing fixedly positioned adjacent to the platform and having a left end panel with a slot, a right end panel, a front panel with a window, and a top panel; a vertical casing extending from the top panel of the gear housing perpendicular to the horizontal platform and having a vertical slit in its side; a gear axle extending within the gear housing between the left end panel and the right end panel of the gear housing; a screw within the vertical casing perpendicular to the gear axle and having a lower end which extends into the gear housing; a bevel gear having its pinion on and rotatable with the gear axle and its ring on and rotatable with the lower end of the screw; a sleeve positioned on the screw and vertically movable in response to the rotation of the screw; an arm fixedly attached at one end to the sleeve, extending horizontally through the slit, and having its extending end over the platform; a collar fixedly attached to the extending end of the arm; a rod fixedly inserted through the collar, said rod extending perpendicular to and toward the platform and having a lower end; a plate fixedly attached to the lower end of the rod and having a side substantially parallel to the platform with a notch in it; a counter pin extending between the left end panel and the right end panel parallel to the gear axle and with an end extending through the left end panel, said counter pin being slidably movable along its length; a counter having a counter shaft, indicia which change with revolutions of the counter shaft, and a clearing pin which changes the indicia to zero when rotated, said counter being fixedly positioned on and movable with the counter pin and having its counter shaft extending parallel to the gear axle toward the right end panel, its clearing pin extending through the slot in the left end panel, and its indicia visible through the window of the front panel; a gear wheel on and rotatable with the extending end of the counter shaft; a lever extending perpendicular to the counter pin and having a first end and a second end fixedly attached to that end of the counter pin extending through the left end panel; a peg fixedly positioned in the first end of the lever and having an extending end extending toward the left end panel of the gear housing, said peg having a first segment with a diameter and a length, a second segment between the first segment and the lever and with a diameter greater than the diameter of the first segment and a length, a third segment between the second segment and the lever and with a diameter greater than the diameter of the second segment and a length, and fourth segment between the third segment and the lever and with a diameter greater than the diameter of the third segment and a length; a scale on the left end panel of the gear housing and having four recesses along the arc described by the first segment of the peg when the lever pivots with rotation of the counter pin, the first recess having a diameter substantially equal to that of the first segment of the peg, the second recess having a diameter substantially equal to that of the second segment of the peg and being a straight line distance from the first recess, the third recess having a diameter substantially equal to that of the third segment of the peg and being a second straight line distance from the second recess, and the fourth recess having a diameter substantially equal to that of the fourth segment of the peg and being a straight line distance from the third recess; a plurality of drive wheels on and rotatable with the gear axle, the first drive wheel having a position along the length of the gear axle which places it in engagement with the gear wheel when the first segment of the peg is in the first recess in the scale; the second drive wheel being positioned on the gear axle between the first drive wheel and right side panel of the gear housing a distance from the first drive wheel equal to the length of the second segment of the peg and having a diameter larger than the diameter of the first drive wheel by an amount equal to the straight line distance between the first recess and the second recess, the third drive wheel being positioned between the second drive wheel and the right side panel a distance from the second drive wheel equal to the length the third segment of the peg and having a diameter greater than the diameter of the second drive wheel by an amount equal to the straight line distance between the second recess and third recess; the fourth drive wheel being positioned between the third drive wheel and the right side panel of the gear housing a distance from the third drive wheel equal to the length of the fourth segment of the peg and having a diameter greater than the diameter of the third drive wheel by an amount equal to the straight line distance between the third recess and the fourth recess, and the diameters of the four drive wheels being such that a point on the first drive wheel travels a specific distance as the rod moves a vertical distance equal to the change in the surface level of a liquid in a standard pint container when the container is filled, a point on the second drive wheel travels the same specific distance as the first when the rod moves a vertical distance equal to the change in surface level of a liquid in a standard quart container when the container is filled, a point on the third drive wheel travels the same specific distance as the first when the rod moves a vertical distance equal to the change in the surface level of a liquid in a half gallon container when the container is filled, and a point on the fourth drive wheel travels the same specific distance when the rod moves a vertical distance equal to the change in surface level of a liquid in a gallon container when the container is filled; a light fixture attached to the collar; and means for rotating the gear axle.

3. A device for measuring the volume of a liquid in any one of a plurality of containers of a plurality of sizes; said device comprising, in combination, a gear axle; a screw perpendicular to the gear axle and having a lower end; a bevel gear having its pinion on and rotatable with the gear axle and its ring on and rotatable with the lower end of the screw; a sleeve positioned on the screw and vertically movable in response to the rotation of the screw; an arm fixedly attached at one end to the sleeve and having its other end extending over a container; a vertical rod attached to the extending end of the arm; a counter pin extending parallel to the gear axle, said counter pin being rotatable and slidably movable along its length; a counter fixedly attached to the counter pin, said counter having a rotatable counter shaft extending from it parallel to the gear axle; a gear wheel fixedly positioned on the extending end of the counter shaft; a scale having a plurality of recesses positioned along the arc of a circle, each of said recesses having a larger diameter than any recess prior to it along the arc; a lever having its first end attached to the counter pin, its second end adjacent to the scale, and a point along its length which describes the arc of a circle identical to that arc along which the recesses of the scale are placed when the lever pivots with rotation of the counter pin; a peg extending through the said point along the length of the lever toward and perpendicular to the scale, said peg having a plurality of segments and each segment having a diameter of one of the plurality of recesses and which is larger than the diameter of any segment more remote than it from the lever; and a plurality of drive wheels positioned along the length of the gear axle, each drive wheel having a diameter which places it in engagement with the gear wheel when one of the plurality of segments is inserted in one of the plurality of recesses.

References Cited by the Examiner

UNITED STATES PATENTS

| | | | |
|---|---|---|---|
| 723,255 | 3/1903 | Eberhardt | 74—341 |
| 826,477 | 7/1906 | Clause | 74—341 |
| 2,098,963 | 11/1937 | Hexter | 33—126.75 |
| 2,561,525 | 7/1951 | McCauley | 33—126.75 |
| 2,685,135 | 8/1954 | Grubelic | 33—126.75 |

LEONARD FORMAN, *Primary Examiner.*

ISAAC LISANN, *Examiner.*

W. D. MARTIN, *Assistant Examiner.*